United States Patent
Stratigos et al.

(10) Patent No.: US 6,189,009 B1
(45) Date of Patent: Feb. 13, 2001

(54) SYSTEM AND METHOD FOR INTEGRATING PAPER-BASED BUSINESS DOCUMENTS WITH COMPUTER-READABLE DATA ENTERED VIA A COMPUTER NETWORK

(75) Inventors: William N. Stratigos, New York; Richard L. Mann, Bronx, both of NY (US)

(73) Assignee: The Voice.com, Inc., New York, NY (US)

( * ) Notice: Under 35 U.S.C. 154(b), the term of this patent shall be extended for 0 days.

(21) Appl. No.: 09/384,525

(22) Filed: Aug. 27, 1999

(51) Int. Cl.[7] ..................................................... G06F 15/40
(52) U.S. Cl. .................................. 707/10; 707/2; 707/3; 707/4; 707/100; 707/107; 707/102
(58) Field of Search ................................... 707/1, 2, 3, 4, 707/8, 9, 10; 395/614, 200, 500; 209/3; 705/23

(56) References Cited

U.S. PATENT DOCUMENTS

| | | |
|---|---|---|
| 4,027,142 | 5/1977 | Paup et al. . |
| 4,321,672 | 3/1982 | Braun et al. . |
| 4,404,649 | 9/1983 | Nunley et al. . |
| 4,491,725 | 1/1985 | Pritchard . |
| 4,523,330 | 6/1985 | Cain . |
| 4,654,793 | 3/1987 | Elrod . |
| 4,672,377 | 6/1987 | Murphy et al. . |
| 4,757,187 | 7/1988 | Millet . |
| 4,791,281 | 12/1988 | Johnsen et al. . |
| 4,981,370 | 1/1991 | Dziewit et al. . |
| 5,079,731 | 1/1992 | Miller et al. . |
| 5,099,340 | 3/1992 | Kamada et al. . |
| 5,191,525 | 3/1993 | LeBrun et al. . |
| 5,195,133 | 3/1993 | Kapp et al. . |
| 5,249,687 | * 10/1993 | Rosenbaum et al. ..................... 209/3 |
| 5,315,504 | 5/1994 | Lemble . |
| 5,367,573 | 11/1994 | Quimby . |
| 5,367,619 | 11/1994 | Dipaolo et al. . |
| 5,404,294 | 4/1995 | Karnik . |
| 5,450,537 | 9/1995 | Hirai et al. . |
| 5,459,854 | * 10/1995 | Sherer et al. ......................... 395/500 |
| 5,534,855 | 7/1996 | Shockley et al. . |
| 5,606,609 | 2/1997 | Houser et al. . |
| 5,640,577 | 6/1997 | Scharmer . |
| 5,652,794 | 7/1997 | Lepetit et al. . |
| 5,671,282 | 9/1997 | Wolff et al. . |
| 5,680,615 | * 10/1997 | Marline et al. ...................... 395/614 |
| 5,689,567 | 11/1997 | Miyauchi . |

(List continued on next page.)

Primary Examiner—Wayne Amsbury
Assistant Examiner—Thuy Do
(74) Attorney, Agent, or Firm—Barlow, Josephs & Holmes, Ltd.

(57) ABSTRACT

In an Internet-based process, a method of integrating paper-based business documents requiring an original signature with electronic data about those documents, and for later retrieving the data entered by the end user to create the documents is characterized by the steps of having the end user enter all required information for creating the required document, saving the gathered data in a database, associating the saved data with a unique identification code, and printing the unique identification code on the paper-based document when it is printed by the end user. The method can further include verification steps for the business client to independently verify the information entered, certification steps for the end user to certify the information entered, and fraud detection elements to protect against altered information on the documents. The printed paper-based document is signed by the end user, and submitted with supporting documentation. When the document is received by the business client, the business client inputs the identification code which is then used to access the stored data, and populate the business client's own database with all of the data used to create the original documents. All data entry is completed and verified by the end user, thus virtually eliminating data entry by the business client.

29 Claims, 3 Drawing Sheets

U.S. PATENT DOCUMENTS

| | | |
|---|---|---|
| 5,692,206 | 11/1997 | Shirley et al. . |
| 5,704,029 | 12/1997 | Wright, Jr. . |
| 5,822,739 | 10/1998 | Kara . |
| 5,832,100 | 11/1998 | Lawton et al. . |
| 5,832,227 | 11/1998 | Anderson et al. . |
| 5,842,195 | 11/1998 | Peters et al. . |
| 5,845,070 | 12/1998 | Ikudome . |
| 5,872,640 | 2/1999 | Cohen et al. . |
| 5,887,271 * | 3/1999 | Powell .................................. 705/14 |
| 5,938,726 * | 8/1999 | Reber et al. ......................... 395/200 |
| 5,978,773 * | 11/1999 | Hudetz et al. ......................... 705/23 |
| 5,988,897 * | 11/1999 | Pierrce .................................. 400/61 |

\* cited by examiner

SYSTEM AND METHOD FOR INTEGRATING PAPER-BASED BUSINESS DOCUMENTS WITH COMPUTER-READABLE DATA ENTERED VIA A COMPUTER NETWORK

BACKGROUND AND SUMMARY OF THE INVENTION

The instant invention relates to a system and method for generating Internet-based business documents, and more particularly to a system and method for electronically generating the Internet-based business documents and then capturing and storing data entered by the end user so that the business client does not need to manually enter, scan, or capture all of the information from printed, paper-based documents received by the business client.

In the past, businesses collected data from paper-based documents. For example, paper-based surveys and application forms were manually filled out by the end user and submitted to the business. Data entry operators manually keyed the collected data in from computer terminals, thus transferring the information into computer-readable formats which can be searched and stored more easily. Today, many businesses collect data through the use of computer networks, such as the Internet. The same surveys and application forms are now available at on-line transactional websites where the end user keys in the information to complete the survey or application. The advantage of collecting data via a network is that the data is received in a computer-readable format.

These previous methods have proved suitable for general business documents that do not require either an original signature, or additional supporting documentation, or both. However, many general business documents, such as mortgage applications, insurance claim forms, government filings, etc., still require an original signature, notarization and/or additional paper-based supporting documentation. In these cases, it is currently neither cost effective, nor practical, to have the data entered electronically, submitted and subsequently manually entered a second time from the signed documents and supporting documentation, and then to verify this information for the business client. This is primarily because of the cost involved in manually re-entering the data from the paper-based documents and validating the data.

The instant invention provides a method of integrating paper-based business documents requiring an original signature with electronic data about those documents, and for later retrieving the data entered by the end user to create the paper-based documents. The method is particularly suitable for an Internet-based process wherein an end user accesses a transactional website of a business through the Internet to complete an electronic document set up on the website. The method is characterized by the steps of having the end user enter all required information for creating the desired document, saving the gathered data in a network-accessible database, generating a unique identification code to be associated with the gathered data, and adding that unique identification code onto the paper-based document when it is printed by the end user. The unique identification code can comprise an alphanumeric string of characters printed directly on the document, or this character string could be translated into a barcode, and the barcode printed on the document. When the data cannot be completely entered in a single session, the method will allow partially completed forms to be stored, retrieved in another session, and subsequently completed.

The method can further include verification steps wherein the business client can independently verify the information entered. For example, the business client computer system could check its existing databases for correct address and contact information for the end user and correct the information on the document. The business client computer system could also check other databases to ensure the validity of the information gathered.

The preferred form of the invention also includes a certification step for the end user to certify the information entered, and also preferably includes fraud detection elements which are printed on the document to protect against altered information on the document.

Once the document is generated and certified by the end user, the paper-based document is printed and signed by the end user, and then submitted with supporting documentation to the business client. When the document is received by the business client, the business client scans the identification code and uses the code to access the stored data that was originally used to generate the document. The business client can thereafter use the data to populate its own database with all of the information used to create the original paper-based documents. The advantage of the process is that all data entry is completed and certified by the end user, thus virtually eliminating data entry by the business client.

Accordingly, it is a primary object of the invention to eliminate, or nearly eliminate, all data entry steps needed for businesses to transfer data from paper-based documents into computer-readable format.

It is another object of the invention to provide a means of generating a paper-based document from data entered via a computer network.

It is still another object to provide a means for the business client to validate the electronically-entered information prior to printing, and also to provide a means for the end user to certify the information prior to printing the paper-based document.

It is yet another object of the invention to automate the integration of these paper-based documents with the electronic information about those documents by storing the electronic information in a database, associating the electronic information with a unique identification code, printing the identification code on the printed documents, and later using the code on the paper documents to access the electronically stored information.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
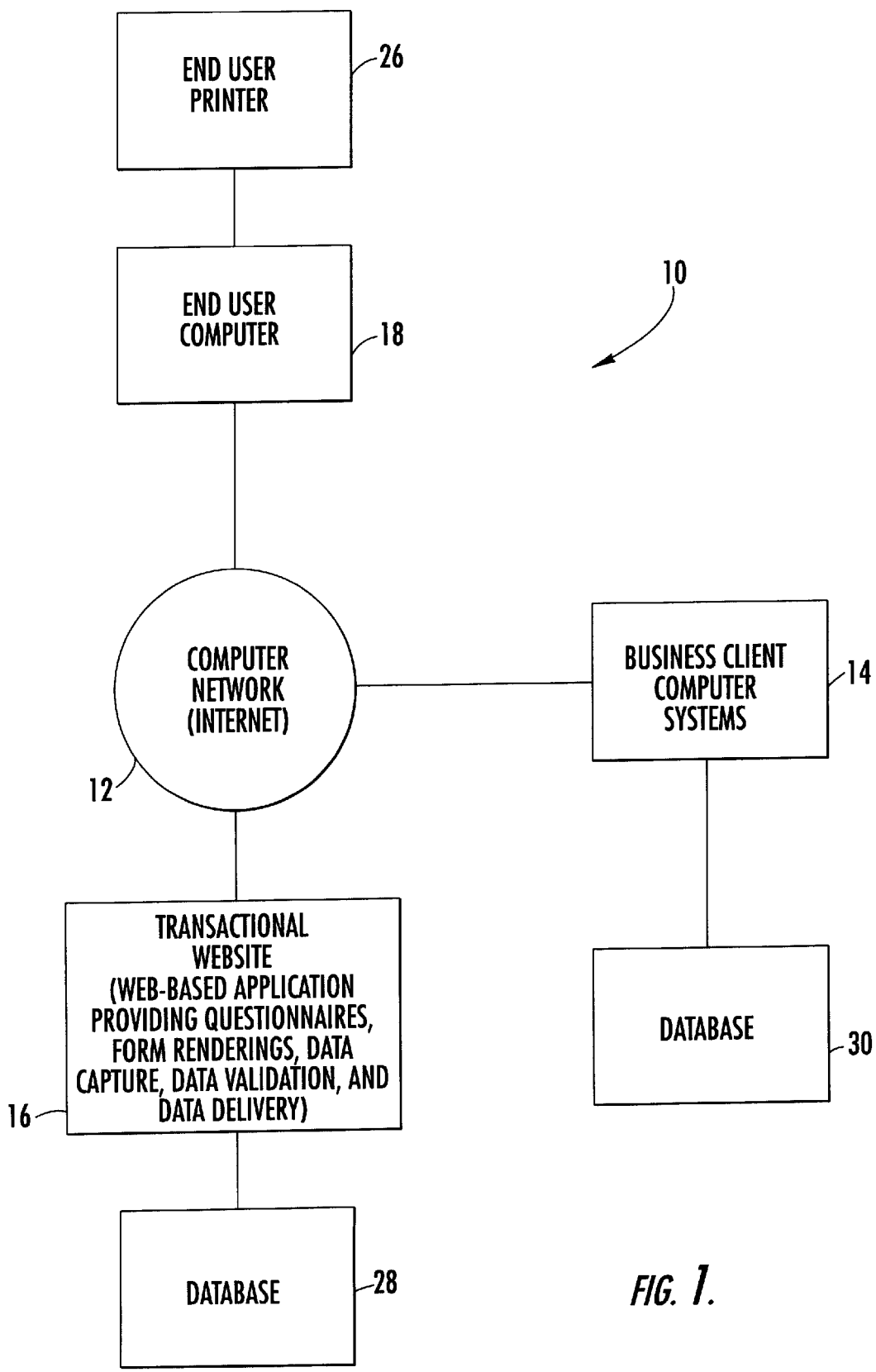
FIG. 1 is a schematic diagram of the computer systems utilized in the methodology of the present invention.

Referring now to the drawings, the computer network system utilized in connection with the instant invention is illustrated and generally indicated at 10 in FIG. 1. As will hereinafter be more fully described, the instant invention provides an improved system and method of integrating paper-based business documents requiring an original signature with electronic data about those documents, and for later retrieving the data entered by the end user to create the documents. The terms "business document" and/or "document" shall be used in a generic sense throughout the specification and it is to be understood that these terms are intended to encompass all types of paper-based business documents, forms, schedules, exhibits, etc., which may be used by a business to gather information and process information. The method is particularly suitable for an Internet-based process wherein an end user accesses a transactional website of a business through the Internet to complete an electronic document set up on the website.

The computer network system 10 includes a network backbone 12, a business client network site 14, a transactional network site 16 set up by the business client to accept documents, and an end user network site 18 utilized by the end user to access the transactional website 16 and complete an on-line document.

The network backbone 12 of the computer network 10 comprises, for purposes of the present invention, the Internet, although the entire system and method as described herein could be used as a completely internal system within an organization, the critical aspect being that all of the network sites 14, 16 and 18 be linked through a common backbone or hub. It should be further understood that the network backbone 12 is intended to include all types of computer and communication networks, such as satellite networks, cable networks, public telephone networks, or any other form of computer or communication network that can carry data.

The business client network site 14 is simply identified as a computer system owned and operated by a business that desires to accept on-line documents. To simplify further discussion and provide a representative example, the business client shall comprise a mortgage lender seeking to receive mortgage applications over the Internet. However, it is to be understood that the present systems and methods are equally applicable to any business or situation where an electronic form, application, or document is generated by the end user.

Figure 2:
FIG. 2 is a fragmented view of a completed rendering of a mortgage loan application document created in accordance with the teachings of the present invention.
Figure 3:
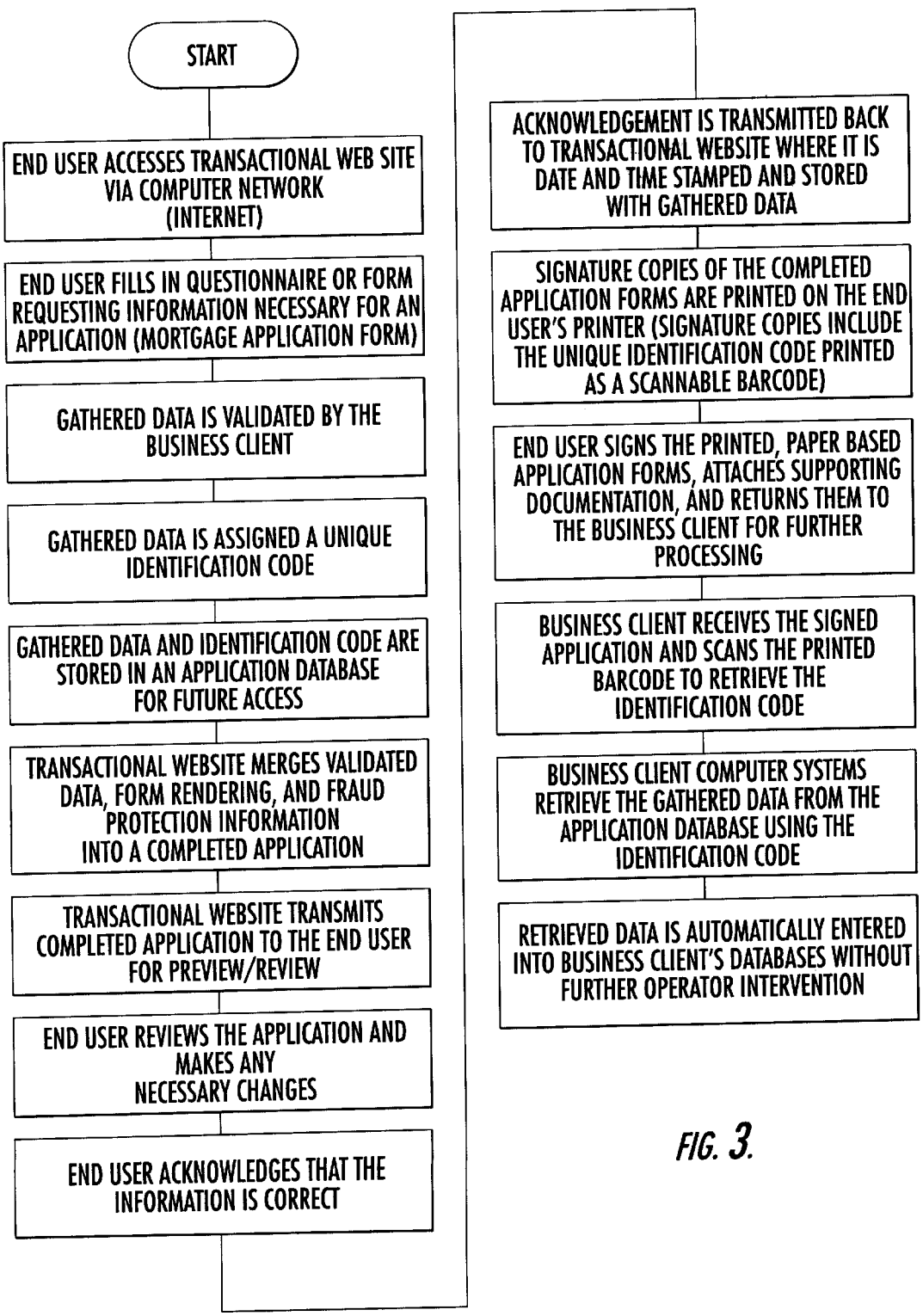
FIG. 3 is a flow chart outlining the basic procedures of the present invention.

The transactional network site 16 preferably comprises a website identified by a unique Uniform Resource Locator (URL). In FIG. 1, the transactional network site 16 is illustrated as comprising a separate computer system and/or site. However, it is to be understood that the business client could just as easily run the website 16 internally from its own computer system 14. The transactional network site 16 runs a software application platform that is operable for gathering data 19 necessary for completion of an electronic document, such as a mortgage application, and for generating an electronic rendering 20 of the completed mortgage application for printing by the end user (See FIG. 2). Typically, such on-line documents are completed by having the end user input data 19 through a question-and-answer-based system, or fill-in boxes (not shown). The data 19 entered by answering the questions is then combined with an electronic rendering 22 of an actual document, and the data 19 gathered is inserted into the correct fields 24, on the document 20. The end user can then print out the rendered document 20 using his/her own computer printer 26. The questionnaire software and document rendering software of the type contemplated herein are well known in the art, and are currently available from several different software vendors.

More specifically, the business client uses forms-creation software to build a list of questions that can be identical to or equivalent in substance to those presented on a paper-based form, and posts these questions to the transactional website 16. Alternatively, these questions may be hard coded using any standard programming language and posted to the transactional website 16. Once the end user accesses the transactional website 16, the questions can be completed using a standard web browser and keyboard. The business client (mortgage lender) also makes available a library of renderings 22 of the original paper-based application forms in a format that can be electronically downloaded to standard PC's 18 and reproduced on standard printers 26. These renderings 22 are also stored on the transactional website 16. If there are multiple documents, the questionnaires and forms are associated with each other so that the correct set of questions is presented for the selected document.

The first step in the process is for the end user to access the transactional website 16 via a computer network 12 and fill out the desired electronic questionnaires, i.e. forms. It is noted here that the end user is actually responsible for all data entry for the business client. By having the end user be the data entry operator, significant improvements in efficiency can be gained. As indicated above, data entry by the end user is preferably done using a standard Internet browser and keyboard. The transactional website software platform will also allow the end user to complete the questionnaire(s) or form(s) in multiple sessions. This feature would be important where the end user may not have enough time to enter all of the necessary information in a single session, or where all of the information is not currently available. In this regard, the software platform provides the ability for partially filled out forms to be stored, retrieved during another session, and subsequently completed and submitted. The data 19 that is entered is then transmitted in computer-readable format from the transactional website 16 to the business client's network site 14. The business client may then validate the data 19 and may in real time, request updates, and/or resolve any inconsistencies between the data submitted and the records maintained by the business client. This is an important step since many entry or omission errors can occur in preparing complicated business documents. In the prior art systems utilizing paper-based documents, these types of data errors would require subsequent contact with the end user to correct and thus delay timely processing of the document. On-line, real-time validation of the data by the use of look-up tables and/or tight integration with the business client's existing computer systems prevents, or at least significantly reduces, these types of errors. The business client would transmit back to the transactional website 16 any changes to the data. In an alternate method, data validation and requests for updates may be performed by the transactional website 16 by using edit checks, double entry, accessing tables or databases downloaded from the business client, or querying the business client's database.

In the preferred method, the gathered data 19 is assigned a unique identification code 32 by the transactional website 16. The data 19 and the identification code 32 is then stored in computer-readable format in a database 28 at the transactional website 16. In an alternative method, the business client assigns the unique identification code 32 to the data and transmits back to the transactional website 16 the identification code 32 and any changes to the data. The transactional website database 28 then stores the data 19 and identification code 32. In yet another alternative, the business client assigns the identification code 32, stores both the data 19 and the identification code 32 in its own database 30, and transmits the identification code 32 and any changes to the data 19 back to the transactional website 16, which also stores the data and the identification code in its database 28. However, it is noted that an inherent advantage to having the transactional website 16 provide the identification code is that the business client would not assign its own identification code until after all paper-based documents and electronic data where physically present at the business client's site 14. This avoids having phantom identifiers assigned by the business client for paper-based documents that are never submitted or received.

The transactional website 16 then generates a printable rendition of the identification code 32 for printing on the completed document 20. The printable rendition of the identification code 32 preferably comprises an alphanumeric string of characters which is translated into barcode format 34 (See FIG. 2). Alternatively, the alphanumeric string could be directly printed onto the form.

The transactional website 16 merges together the validated data 19, the identification code 32, the bar code 34, and the exact rendering 22 of the uncompleted document to create a rendering 20 of the completed document to be signed. The integration is done so that the data 19 appears as printed text in the appropriate fields 24 of the document 20. In the preferred form of the invention, the identification code 32 appears as both an alphanumeric string and as a barcode 34 on the rendered document 20. If the document 20 consists of more than one page, the page number is added to the bar code 34 at some predetermined location, or is provided as a separate bar code.

The preferred method of the invention further comprises the addition of fraud protection elements to the rendered document 20. These fraud protection elements comprise an encrypted barcode 36 printed on the document containing some key portions of the data 19. More specifically, selected portions of the data 19 would be copied, encrypted, and then transformed into a barcode format. This encrypted bar code 36 is created by either the transactional website 16 or the business client site 14 and generated in a printable rendition for printing onto the document 20. The barcode 36 will later be scanned by the business client upon receipt of the document, decrypted and compared to the actual data 19 that was used to create the document 20 and now also appears on the document.

The merged data 19 and rendered document 22 (with identification code 32 and encrypted fraud barcodes 36) are then downloaded, i.e. transmitted to the end user's PC 18. Prior to printing, the rendered completed document 20 is displayed to the end user in a preview/review mode. The end user can review the entire document 20, and make any necessary changes to the data. Once the end user is satisfied that the information is correct, the end user is required to acknowledge on a predetermined basis (field by field, page by page, etc.) that the correct data 19 has been placed in the correct fields 24 of the rendered document 20. This certification is transmitted back to the transactional website 16 where it is time stamped and recorded before signature copies of the document 20 are printed. The advantage of having the end user validate the information is that it creates a record that the end user reviewed the information and certified the document 20 prior to printing. In the event that the end user submits an altered or counterfeit document, the transactional website 16 will be able to furnish the business client with supporting evidence as to the accuracy of the information that was originally entered and merged with the rendered document.

At least one, but preferably two, copies of the rendered document 20 are printed at the end user's printer 26. The document 20 is printed in a format that will later support and facilitate barcode scanning for retrieval of the data 19, and/or other scanning or reading of the data 19 using Optical Character Recognition (OCR) technology in the event the data cannot be retrieved through the network 10.

The printed document 20 is signed by the end user and notarized as needed. Additional supporting documentation is attached, and the complete paper-based document package is sent by the end user via mail services to the business client.

At the business client site 14, the paper-based document package is processed as any other paper-based general business document except as noted below. In accordance with the teaching of the invention, the identification code 32 is scanned with imaging software, i.e. scanned with a bar code scanner, electronically read using alphanumeric OCR technology, or manually keyed in to the business client computer system 14. Once the identification code 32 is entered into the system 14, all of the corresponding data 19 used to create the document 20 is available in a computer-readable format without having to undergo a manual data entry process. In the preferred method, the business client's computer system 14 uses the identification code 32 to automatically retrieve the computer-readable data 19 from the network-accessible database 28, 30 where the data is stored. The business client additionally scans the fraud element barcode 36, decrypts the data encoded in the barcode 36, and compares that data to the data 19 obtained from the storage database 28, 30 and to the data as it is printed on the document. This step is performed as a method of preventing altered or counterfeit documents 20 from proceeding to the next step in the business client's review process.

An alternative fraud detection method comprises scanning digital images of the documents submitted, reading the text data with an OCR program and comparing the scanned text with the data 19 obtained electronically over the network.

It can therefore be seen that the present system is highly effective and efficient for integrating paper-based documents 20 with the electronic data 19 originally used to generate the documents. The steps of saving the electronic data with a unique identification code 32 and then using the unique identification code to later retrieve that information is tremendously helpful in reducing, if not eliminating, all manual data entry for the business client. The system uniquely takes advantage of the end user as a data entry operator to transfer data from paper-based forms into a computer-readable format. In cases where the gathered data is immediately transmitted to the business client for validation, the business client will have the opportunity to begin the processing cycle before receipt of the actual paper-based documents. This "pre-processing" of the gathered data can significantly decrease overall processing time and allow the business client to more efficiently process the paper-based documents upon receipt thereof. Electronic generation of the documents and saving of the data also reduces the number of mailings necessary to accomplish the entire application process. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A system for electronically generating a paper-based document customized for an individual end user, and for integrating said document with data used to create said document, said system including a computer system comprising:

a computer network;

a data entry computer connected to said computer network;

a transactional network site connected to said computer network, said transactional network site being accessible to said data entry computer through said computer network, said transactional network site having document creation software that is programmed to interactively request personalized document creation data from the end user, and uses said data provided by said end user to create a document that is to be printed for the end user;

software means for generating a unique identification code, for associating said gathered personalized document creation data with said unique identification code, and for generating a printable rendition of said identification code, said printable rendition of said identification code being provided to said document creation software for printing on said document;

a network accessible database for storing said data and said unique identification code associated with said data;

a printer for printing said document, said printed document including said personalized data and said unique identification code;

a business client network site connected to said computer network, said business client network site having means for reading said unique identification code, said business client network site using said identification code for automatically accessing said data within said network accessible database and for automatically processing said accessed data.

2. The network system of claim 1 wherein said printable rendition of said identification code comprises a bar code including said identification code.

3. The network system of claim 2 wherein said software means includes means for generating a printable rendition of a fraud detection element for printing on said document.

4. The network system of claim 1 where said printable rendition of said identification code comprises an alphanumeric string of characters.

5. The network system of claim 4 wherein said software means includes means for generating a printable rendition of a fraud detection element for printing on said document.

6. The network system of claim 1 wherein said software means includes means for generating a printable rendition of a fraud detection element for printing on said document.

7. In the system of claim 1, said network accessible database comprising a database connected to said transactional network site, said business client network site using said unique identification code for automatically retrieving said data from said network accessible database.

8. In the system of claim 1, said network accessible database comprising a first database connected to said transactional network site, said system further comprising a second database connected to said business client network site, said data and said unique identification code being automatically stored in said first and second databases.

9. A method of electronically generating a paper-based document that requires an original signature of an end user and integrating said document with electronic data used to create said document, said method comprising the steps of:

providing access to a transactional network site via a computer network, said transactional network site having document creation software that interactively requests personalized document creation data from an end user for use in creating said document and uses said data provided by said end user to create a document that is to be printed for said end user, signed by said end user, and returned to a business client;

gathering said personalized document creation data from said end user and entering said data through said computer network;

assigning said gathered data a unique identification code;

storing said gathered data and said unique identification code in a network accessible database;

generating a printable rendition of said unique identification code;

electronically generating a printable rendering of said document to be submitted by said end user to a business client, said document including said gathered data, and said printable rendition of said unique identification code;

printing said document;

signing said printed document;

submitting said signed document to said business client;

inputting said identification code from said submitted document; and accessing said gathered data from said network accessible database using said identification code.

10. The method of claim 9 further comprising the step of creating and generating a printable rendition of a fraud detection element for printing on said document.

11. The method of claim 9 further comprising the step of having said end user acknowledge the correctness of the gathered data prior to printing of the document.

12. The method of claim 9 wherein said step of gathering said data is completed in a plurality of separate on-line sessions wherein a first portion of said data is entered and saved in a first session, and a second portion of said data is entered in a second session.

13. In the method of claim 9, said network accessible database comprising a database connected to said transactional network site, said step of accessing said gathered data comprising retrieving said data from said network accessible database.

14. In the method of claim 9, said network accessible database comprising a first database connected to said transactional network site, said system further comprising a second database connected to said business client network site, said data and said unique identification code being automatically stored in said first and second databases, said step of accessing said gathered data comprising accessing said data from said second database.

15. A method of electronically generating a paper-based document that requires an original signature and integrating said document with data used to create said document, said method comprising the steps of:

providing access to a transactional network site via a computer network, said transactional network site having document creation software that requests data from an end user, and uses said data entered by said end user to create a document that is to be printed, signed by said end user, and returned to a business client;

gathering said data from said end user wherein said end user enters said data through said computer network;

assigning said gathered data a unique identification code;

storing said gathered data and said unique identification code in a network accessible database;

generating a printable rendition of said unique identification code;

electronically generating a completed rendering of said document including said gathered data, and said printable rendition of said unique identification code;

printing said completed rendering of said document;

signing said printed document;

returning said signed document to said business client;

inputting said identification code from said returned document;

accessing said network accessible database using said identification code; and retrieving said gathered data from said network accessible database.

16. The method of claim 15 further comprising the step of validating said gathered data prior to electronically generating a completed rendering of said document.

17. The method of claim 16 wherein said step of validating said data includes checking said gathered data for required information and the validity of said gathered data prior to electronically generating a completed rendering of said document.

18. The method of claim 17 further comprising the step of creating and generating a printable rendition of a fraud detection element for printing on said document.

19. The method of claim 16 further comprising the step of creating and generating a printable rendition of a fraud detection element for printing on said document.

20. The method of claim 15 further comprising the step of presenting said electronically generated rendering of said document to the end user in preview mode, and requiring the end user to validate the correctness of the information on the document prior to printing thereof.

21. The method of claim 20 further comprising the step of creating and generating a printable rendition of a fraud detection element for printing on said document.

22. The method of claim 15 further comprising the step of creating and generating a printable rendition of a fraud detection element for printing on said document.

23. The method of claim 15 wherein said step of gathering said data is completed in a plurality of separate on-line sessions wherein a first portion of said data is entered and saved in a first session, and a second portion of said data is entered in a second session.

24. A method of electronically generating a paper-based document that requires an original signature of an end user and integrating said document with electronic data used to create said document, said method comprising the steps of:

providing access to a transactional network site via a computer network, said transactional network site having document creation software that interactively requests personalized data from an end user for use in creating said document and uses said data as provided by said end user to create a document that is to be printed for said end user and returned to a business client;

gathering personalized data from said end user;

entering said data through said computer network;

assigning said gathered data a unique identification code;

storing said gathered data and said unique identification code in a network accessible database;

generating a printable rendition of said unique identification code;

electronically generating a printable rendering of said document to be submitted by said end user to a business client, said document including said gathered data, and said printable rendition of said unique identification code;

printing said document;

submitting said signed document to said business client;

inputting said identification code from said submitted document; and accessing said gathered data from said network accessible database using said identification code.

25. The method of claim 24 further comprising the step of creating and generating a printable rendition of a fraud detection element for printing on said document.

26. The method of claim 24 further comprising the step of having said end user acknowledge the correctness of the gathered data prior to printing of the document.

27. The method of claim 24 wherein said step of gathering said data is completed in a plurality of separate on-line sessions wherein a first portion of said data is entered and saved in a first session, and a second portion of said data is entered in a second session.

28. In the method of claim 24, said network accessible database comprising a database connected to said transactional network site, said step of accessing said gathered data comprising retrieving said data from said network accessible database.

29. In the method of claim 24, said network accessible database comprising a first database connected to said transactional network site, said system further comprising a second database connected to said business client network site, said data and said unique identification code being automatically stored in said first and second databases, said step of accessing said gathered data comprising accessing said data from said second database.

* * * * *